Aug. 27, 1946.   P. A. H. MOSSAY ET AL   2,406,704
MULTIPHASE A. C. TRANSFORMER
Filed Oct. 28, 1942

P. A. H. Mossay,
B. Schwarz and
E. Barraclough
by Edwards, Bower & Pool

Patented Aug. 27, 1946

2,406,704

UNITED STATES PATENT OFFICE 2,406,704

MULTIPHASE ALTERNATING CURRENT TRANSFORMER

Paul Alphonse Hubert Mossay, Benno Schwarz, and Edgar Barraclough, Norwich, England Application October 28, 1942, Serial No. 463,640
In Great Britain November 4, 1941

6 Claims. (Cl. 175—356)

This invention refers to a new form of two, three or multiphase A. C. transformer.

Multiphase A. C. transformers as usually constructed have a row of parallel legs made of laminated sheet iron connected magnetically by yokes made also of laminated sheet iron, the primary and secondary windings, in the form of coils, being accommodated on the legs.

The present invention comprises a transformer of cylindrical or prismatic structure having radial legs which provide radial magnetic paths for the magnetic fluxes created by the transformer windings, and common outer and inner concentric yokes which close said magnetic paths.

The inner yoke may be and advantageously is rotatable as a whole or in part about the central axis of the structure.

Figure 1:
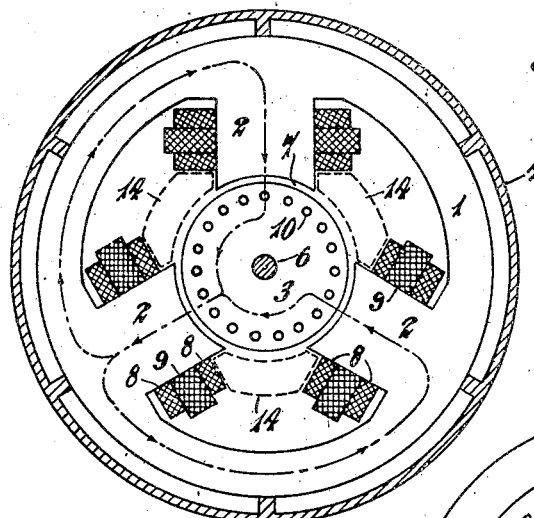
Figure 1 is a part sectional plan of one form of the transformer having an inner yoke which is rotatable as a whole.
Figure 2:
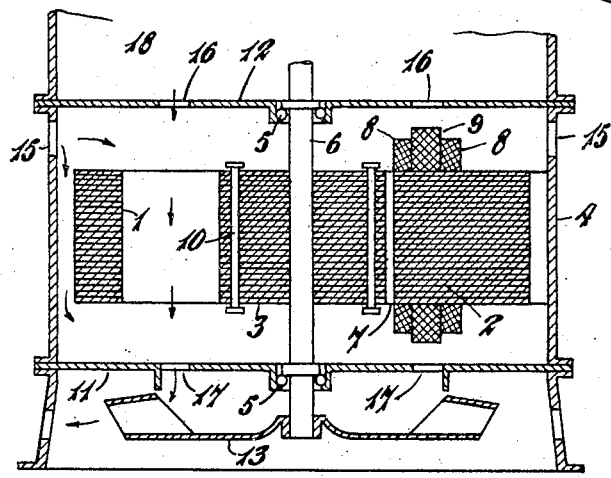
Figure 2 is a sectional elevation of a transformer of the same form as that illustrated by Figure 1, depicting the system of ventilation.

In the example illustrated by Figures 1 and 2, the iron core of the transformer is composed of two parts, namely, an annular outer yoke 1 with equi-spaced radial legs 2, and a cylindrical inner yoke 3 concentric with the outer yoke 1, said core being accommodated in a cast iron or welded frame or casing 4 of a similar nature to those used for A. C. induction motors or alternators.

The yokes 1 and 2 are constructed of packs of sheet iron laminations or punchings.

The inner yoke 3 is mounted on a shaft 6 for free rotation with said shaft within the space bounded by the inner ends of the legs 2 of the outer yoke 1, said inner ends being curved to conform to the periphery of the inner yoke 3 and a narrow air gap 7 being provided between them and the inner yoke 3.

Primary windings 8 and secondary windings 9 in the form of pancake coils, are accommodated on the legs 2 of the outer yoke, two primary coils and one secondary coil, suitably insulated from one another and from the yoke, being provided on each leg 2.

The rotary yoke 3 is provided with a squirrel cage winding 10, accommodated in closed slots formed in said yoke. The slots can, however, be half-closed slots if preferred.

When the three primary phases 8 are fed from a three phase supply, then magnetic flux from each phase is vectorially displaced 120° from the other two phases.

The flux of each phase passes through the leg 2 on which the respective phase winding is accommodated and, as indicated by chain lines in Figure 1, for one phase, it divides in the annular portion of the outer yoke 1 into two parts which pass through the two adjacent thirds of said annular portion, then through the other two legs 2, and closes through the inner rotatable yoke 3, thus crossing the air gap 7 twice.

Magnetic bridges 14, composed of sheet iron laminations, can be provided, as shown in dotted lines in Figure 1, to by-pass part of the flux, such bridges contributing also to form supports for positioning the winding coils 8 and 9.

When the bridges 14 are provided, only part of the flux crosses the air gap, which results in a reduction of the magnetising current.

The superposition of the three phase fluxes, which are vectorially displaced by 120° electrical, results in a rotating flux in the outer and inner yokes 1 and 3.

This flux in the inner yoke 3 induces a current in the squirrel cage winding 10, with consequent rotation of the inner yoke 3 at approximately synchronous speed, which, in the present example, is equal to that of a two pole machine of the same frequency, that is to say, 3000 R. P. M. with a 50 cycle supply.

As illustrated schematically by Figure 2, the shaft 6 is mounted in ball bearings 5 in the bottom and top end shields 11 and 12 of the frame or casing 4, and is extended through the bottom end shield 11 to carry a fan 13.

The fan 13 draws cooling air through the transformer, the air, as shown by the arrows in the figure, entering through openings 15 in the frame or casing 4 and/or through openings 16 in the top end shield 12 and passing out through openings 17 in the bottom end shield 11 which is constructed to form a base on which the whole structure is vertically mounted.

The above described ventilating arrangement permits also of simultaneous ventilation of other apparatus such as another transformer or an induction regulator that may be required for working electrically in conjunction with the transformer according to the invention, such other apparatus being accommodated in a casing 18, shown broken away, arranged on top of the transformer casing 4, so that cooling air is drawn by the fan 13 through the casing 18 and thence through the openings 16 in the top end shield 12.

Figure 3:
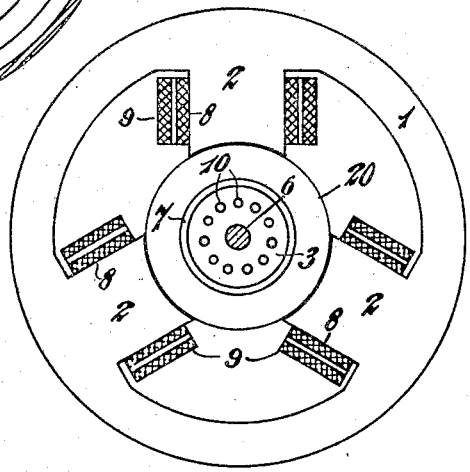
Figure 3 is a plan view of a modified form in which part only of the inner yoke is rotatable, the casing being omitted.

As illustrated by Figure 3, the inner yoke can be formed in two parts, namely, a rotary part 3 and a stationary part 20 separated by a narrow air gap 7, the two parts being constructed of packs of sheet iron laminations or punchings.

The rotary part 3 is of the same character as, but of smaller dimension than, the part 3 of the previous example and, in like manner, is provided with a squirrel cage winding 10.

The stationary part 20, in the form illustrated, is of circular shape, in the nature of a hollow cylinder, and fits in the concave ends of the legs 2 in close contact therewith.

The stationary part 20 instead of being integral with the legs 2 is formed separately and this separate formation permits of the application to the legs of pre-formed winding coils 8 and 9 which, in Figure 3, are shown as concentric coils.

It will also be appreciated that the outer contour of the fixed part 20 need not be circular.

Further, as will be readily understood by those skilled in the art, without necessity for illustration, where the legs 2 are formed integrally with the part 20, the outer yoke can be formed as a ring which is fitted on to the outer ends of the legs after the winding coils have been placed in position on the legs.

The combined section of both parts 3 and 20 is made sufficient to carry the flux, a part only of which crosses the air gap 7.

As applied to a two phase transformer, to obtain a rotating magnetic field, two of the legs 2 accommodating the primary and secondary windings can be arranged with their axes at 90°, the third leg then being arranged in symmetrical relation thereto, i. e., with its axis at 135° to each of the other two axes. The third leg then carries the vectorial sum of the two phase fluxes and a standard angular speed of the resulting average rotating field ensues.

The third leg may accommodate windings for enabling a two phase to three phase transformation to be obtained.

The number of phases for the transformer can differ from two or three and, moreover, may be different for the primary and secondary systems, in which case a larger number of legs, exceeding the number of either the primary or secondary phases, or both, can be employed.

As compared with the orthodox structure of transformers, there are a number of essential differences in the function and performance of the transformer according to the invention. Both yokes, the outer as well as the inner yoke, corresponding to the top and bottom yokes of orthodox transformers, can be reduced in section to half of the top and bottom yokes of the usual three leg transformer, the yokes of which have to carry the full flux of one phase, whereas the yokes of a transformer in accordance with the invention have to carry only half of this flux.

In order to obtain the same result with the known orthodox construction, it would be necessary to build a five leg structure instead of one of three legs. This is frequently done for different reasons, foremost in order to avoid the defect of certain higher harmonics of flux and voltage, inherent to the usual three legged structure. The same effect is obtained in a much more economical way by the structure according to the invention, with the added advantage of a reduction in weight.

Moreover, in the rotating part 3 forming the inner yoke, or part thereof, of the transformer according to the invention, no appreciable iron losses are incurred, since the frequency in it is negligible.

Another advantage of the structure according to the invention is that, as already mentioned, a fan can be mounted on the shaft of the rotary part 3 for the purpose of cooling the transformer. This forced ventilation is obtained at little cost and maximum reliability and without the use of an independently driven fan which, in the event of its failing, might endanger the safety of the transformer, thus entailing further protective devices and interlocking mechanism.

The construction according to the invention lends itself to very efficient ventilation in view of the large surfaces exposed to the air flow, allowing a better use of the active materials, even as compared with an oil cooled transformer of the orthodox construction.

Any of the described structures can be used for oil cooling.

The rotary yoke may be used to drive a small propeller to activate the oil circulation and increase the cooling efficiency of the tank.

Another possibility inherent to the transformer construction according to the invention, is that it can be readily adapted to obtain a totally enclosed structure with air cooling only, thus dispensing with oil cooling and its inherent disadvantages in locations where oil cooling is not desirable on account of fire hazards.

Figure 4:
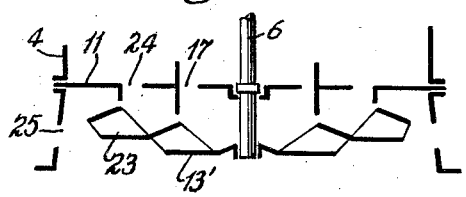
Fig. 4 is a partial view similar to Figure 2 and illustrating a modified form of fan structure for internal and external air circulation.

A transformer constructed according to the invention can be used in connection with any known system of air cooling used for rotating electrical machinery based on external air surface cooling combined with internal air circulation, the rotary part 3 of the transformer being easily adapted to drive two fans, one for the external and the other for the internal air circulation. For instance, as shown in Fig. 4, the inner fan 13' draws its supply from the inner portions of the transformer structure while the outer fan 23 circulates air through openings 24 from around the periphery of the transfomer, both fans discharging through the outlet openings 25.

A transformer constructed in accordance with the invention, with a rotary part 3, can be, as already mentioned, readily combined in a suitable structure with another stationary transformer, induction regulator, motor, rectifier or the like, providing the cooling air for one or several of these appliances, and this refers also to any such structure for surface cooling.

The winding for the rotary part 3 of the transformer can be of any suitable description known in connection with induction or synchronous motors, the slots in said rotary part for the reception of the winding being open, closed or semi-closed, as may be desired.

A pitched winding with shortened pitch, for instance, facilitates starting of the rotary part in view of the salient pole construction of the stationary part and the resulting flux distribution at the periphery.

The starting current, at the moment when the primary winding of the transformer is switched on to the line, is insignificant, even where the rotary part 3 is provided with a plain squirrel cage winding, since said rotary part and its winding require to be designed only for a very small fraction of the transformer output, sufficient to meet the power requirement for driving the fan or fans.

The outer yoke 1 may be of other shape than circular, for instance, prismatic.

We claim:

1. A multiphase transformer comprising a stationary annular outer yoke and an inner yoke both of magnetizable material and arranged in concentric relation, the said inner yoke embodying a rotatable element, primary and secondary windings associated with radial legs of magnetisable material provided on said outer yoke extending into close proximity to said rotary inner yoke, said radial legs providing radial magnetic paths closed by said yokes for the magnetic fluxes linked with said windings.

2. A multiphase transformer comprising a stationary annular outer yoke and an inner yoke of magnetizable material arranged in concentric relation, said inner yoke embodying a rotary element provided with a winding, radial legs on said outer yoke extending into close proximity to said wound rotary inner yoke, and primary and secondary windings on said radial legs, said radial legs providing radial magnetic paths closed by said yokes for the magnetic fluxes linked with said windings.

3. A multiphase transformer comprising an outer annular yoke and an inner yoke both of magnetizable material and arranged in concentric relation, said inner yoke being composed of a stationary unit and a rotary unit within said stationary unit, primary and secondary windings associated with radial legs of magnetizable material extending between said outer yoke and the stationary unit of said inner yoke, said radial legs providing radial magnetic paths closed by said yokes for the magnetic fluxes linked with said primary and secondary windings.

4. A multiphase transformer comprising an annular outer yoke and a rotary inner yoke both of magnetizable material and arranged in concentric relation, primary and secondary windings associated with radial legs of magnetizable material extending between said outer and inner yokes to provide radial magnetic paths closed by said yokes for the fluxes linked with said windings, a casing enclosing said yokes, said casing having openings for the entry and discharge of cooling air, and a fan driven by said rotary inner yoke for circulating cooling air through said casing.

5. A multiphase transformer as claimed in claim 4, formed as a totally enclosed unit, having two fans driven by the rotary inner yoke, one of said fans for circulating internal air and the other for circulating external air.

6. A multiphase transformer comprising an outer structure of laminated sheet iron having a peripheral yoke portion and radial legs extending inward from said peripheral yoke toward a common axis at right angles to the planes of said laminations, primary and secondary windings on said radial legs, an inner structure of magnetizable material at the inner ends of said radial legs and embodying a motor rotor in the planes of said laminations and having its axis parallel to said common axis, and a fan structure driven by said rotor and acting to circulate air currents in an axial direction across the edges of said laminations of said outer structure.

PAUL ALPHONSE HUBERT MOSSAY.
BENNO SCHWARZ.
EDGAR BARRACLOUGH.